US008155601B2

(12) United States Patent
Rofougaran et al.

(10) Patent No.: US 8,155,601 B2
(45) Date of Patent: Apr. 10, 2012

(54) METHOD AND SYSTEM FOR POWER COMBINING IN A MULTI-PORT DISTRIBUTED ANTENNA

(75) Inventors: Ahmadreza Rofougaran, Newport Coast, CA (US); Maryam Rofougaran, Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 503 days.

(21) Appl. No.: 12/396,935

(22) Filed: Mar. 3, 2009

(65) Prior Publication Data

US 2010/0225556 A1 Sep. 9, 2010

(51) Int. Cl.
*H04B 1/44* (2006.01)
(52) U.S. Cl. .......................................... 455/78; 343/860
(58) Field of Classification Search .................. 343/850, 343/860; 455/78
See application file for complete search history.

(56) References Cited

U.S. PATENT DOCUMENTS

| 7,212,788 | B2* | 5/2007 | Weber et al. ............... 455/78 |
| 7,233,773 | B2* | 6/2007 | Hansen et al. .............. 455/69 |
| 7,348,842 | B2* | 3/2008 | Ichitsubo et al. ............ 330/66 |
| 7,450,072 | B2* | 11/2008 | Kim et al. ............... 343/700 MS |
| 7,865,149 | B2* | 1/2011 | Han et al. .................. 455/73 |
| 2005/0281354 | A1* | 12/2005 | Kim .......................... 375/299 |
| 2008/0159364 | A1* | 7/2008 | Rofougaran ............... 375/219 |
| 2008/0299930 | A1* | 12/2008 | Rofougaran et al. ......... 455/275 |
| 2010/0080204 | A1* | 4/2010 | Yen et al. ................... 370/338 |
| 2010/0157858 | A1* | 6/2010 | Lee et al. ................... 370/297 |
| 2010/0171661 | A1* | 7/2010 | Rofougaran ............... 342/372 |
| 2010/0238075 | A1* | 9/2010 | Pourseyed ................. 343/702 |
| 2011/0105061 | A1* | 5/2011 | Yu et al. .................. 455/127.2 |
| 2011/0150050 | A1* | 6/2011 | Trigui et al. ............... 375/219 |
| 2011/0159823 | A1* | 6/2011 | Lo et al. .................. 455/78 |

\* cited by examiner

*Primary Examiner* — Lincoln Donovan
*Assistant Examiner* — William Hernandez
(74) *Attorney, Agent, or Firm* — Farjami & Farjami LLP

(57) ABSTRACT

Methods and systems for power combining in a multi-port distributed antenna are disclosed and may include power combining signals from power amplifiers (PAs) on a chip. The PAs may be coupled to a single distributed antenna via antenna ports. A phase of each of the signals may be matched at the antenna ports via phase-matching circuitry. A characteristic impedance may be configured at the ports based on a location of the ports. The PAs may be impedance matched to the antenna ports via impedance matching elements. A power level of the power-combined signals may be monitored via a power detector coupled to the distributed antenna. The power detector may include an envelope detector, such as a diode. The antenna may be integrated on the chip or may be located external to the chip. The signals may include RF signals and the antenna may include a microstrip antenna.

20 Claims, 4 Drawing Sheets

METHOD AND SYSTEM FOR POWER COMBINING IN A MULTI-PORT DISTRIBUTED ANTENNA

CROSS-REFERENCE TO RELATED APPLICATIONS/INCORPORATION BY REFERENCE

This application makes reference to:
U.S. patent application Ser. No. 12/367,892 filed on Feb. 9, 2009;
U.S. patent application Ser. No. 12/396,964 filed on Mar. 3, 2009;
U.S. patent application Ser. No. 12/397,005 filed on Mar. 3, 2009;
U.S. patent application Ser. No. 12/397,024 filed on Mar. 3, 2009;
U.S. patent application Ser. No. 12/397,040 filed on Mar. 3, 2009;
U.S. patent application Ser. No. 12/397,060 filed on Mar. 3, 2009; and
U.S. patent application Ser. No. 12/397,096 filed on Mar. 3, 2009.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for power combining in a multi-port distributed antenna.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for power combining in a multi-port distributed antenna, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for power combining in a multi-port distributed antenna. Exemplary aspects of the invention may comprise power combining signals from a plurality of power amplifiers (PAs) on a chip. The PAs may be coupled to a single distributed antenna via a plurality of antenna ports. A phase of each of the signals may be matched at the plurality of antenna ports via phase-matching circuitry. A characteristic impedance may be configured at each of the plurality of antenna ports based on a location of each of the antenna ports. The PAs may be impedance matched to the plurality of antenna ports via impedance matching elements. A power level of the power-combined signals may be monitored via a power detector coupled to the distributed antenna. The power detector may comprise an envelope detector, such as a diode. The distributed antenna may be integrated on the chip or may be located external to the chip. The signals may comprise RF signals and the distributed antenna may comprise a microstrip antenna.

Figure 1:
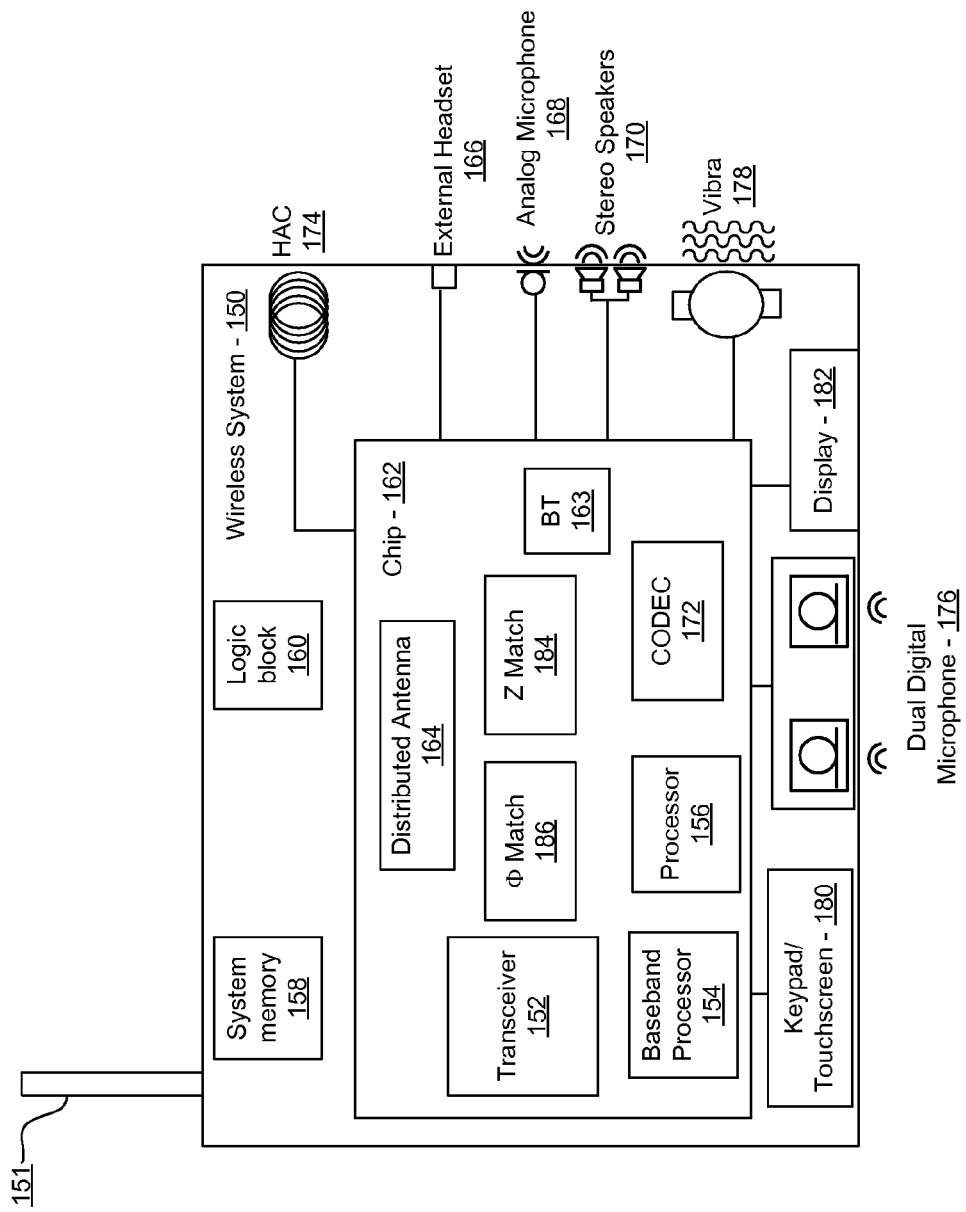
FIG. 1 is a block diagram of an exemplary wireless system, which may be utilized in accordance with an embodiment of the invention.

FIG. 1 is a block diagram of an exemplary wireless system, which may be utilized in accordance with an embodiment of the invention. Referring to FIG. 1, the wireless system 150 may comprise an antenna 151, a transceiver 152, a baseband processor 154, a processor 156, a system memory 158, a logic block 160, a chip 162, a distributed antenna 164, and an external headset port 166. The wireless system 150 may also comprise an analog microphone 168, integrated hands-free (IHF) stereo speakers 170, a hearing aid compatible (HAC) coil 174, a dual digital microphone 176, a vibration transducer 178, a keypad and/or touchscreen 180, and a display 182. The wireless system 150 may comprise a wireless communication device such as a cellphone or a smartphone.

The transceiver 152 may comprise suitable logic, circuitry, and/or code that may be enabled to modulate and upconvert baseband signals to RF signals for transmission by one or more antennas, which may be represented generically by the antenna 151. The transceiver 152 may also be enabled to downconvert and demodulate received RF signals to baseband signals. The RF signals may be received by one or more antennas, which may be represented generically by the antenna 151, or the distributed antenna 164. Different wireless systems may use different antennas for transmission and reception. The transceiver 152 may be enabled to execute other functions, for example, filtering the baseband and/or RF signals, and/or amplifying the baseband and/or RF signals. Although a single transceiver 152 is shown, the invention is not so limited. Accordingly, the transceiver 152 may be implemented as a separate transmitter and a separate receiver. In addition, there may be a plurality transceivers, transmitters and/or receivers. In this regard, the plurality of transceivers, transmitters and/or receivers may enable the wireless system 150 to handle a plurality of wireless protocols and/or standards including cellular, WLAN and PAN. Wireless technologies handled by the wireless system 150 may comprise GSM, CDMA, CDMA2000, WCDMA, GMS, GPRS, EDGE, WIMAX, WLAN, 3GPP, UMTS, BLUETOOTH, and ZIGBEE, for example.

The baseband processor 154 may comprise suitable logic, circuitry, and/or code that may be enabled to process baseband signals for transmission via the transceiver 152 and/or the baseband signals received from the transceiver 152. The processor 156 may be any suitable processor or controller such as a CPU, DSP, ARM, or any type of integrated circuit processor. The processor 156 may comprise suitable logic, circuitry, and/or code that may be enabled to control the operations of the transceiver 152 and/or the baseband processor 154. For example, the processor 156 may be utilized to update and/or modify programmable parameters and/or values in a plurality of components, devices, and/or processing elements in the transceiver 152 and/or the baseband processor 154. At least a portion of the programmable parameters may be stored in the system memory 158.

Control and/or data information, which may comprise the programmable parameters, may be transferred from other portions of the wireless system 150, not shown in FIG. 1, to the processor 156. Similarly, the processor 156 may be enabled to transfer control and/or data information, which may include the programmable parameters, to other portions of the wireless system 150, not shown in FIG. 1, which may be part of the wireless system 150.

The processor 156 may utilize the received control and/or data information, which may comprise the programmable parameters, to determine an operating mode of the transceiver 152. For example, the processor 156 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 158 via the processor 156, for example. The information stored in system memory 158 may be transferred to the transceiver 152 from the system memory 158 via the processor 156.

The system memory 158 may comprise suitable logic, circuitry, and/or code that may be enabled to store a plurality of control and/or data information, including parameters needed to calculate frequencies and/or gain, and/or the frequency value and/or gain value. The system memory 158 may store at least a portion of the programmable parameters that may be manipulated by the processor 156.

The logic block 160 may comprise suitable logic, circuitry, and/or code that may enable controlling of various functionalities of the wireless system 150. For example, the logic block 160 may comprise one or more state machines that may generate signals to control the transceiver 152 and/or the baseband processor 154. The logic block 160 may also comprise registers that may hold data for controlling, for example, the transceiver 152 and/or the baseband processor 154. The logic block 160 may also generate and/or store status information that may be read by, for example, the processor 156. Amplifier gains and/or filtering characteristics, for example, may be controlled by the logic block 160.

The BT radio/processor 163 may comprise suitable circuitry, logic, and/or code that may enable transmission and reception of Bluetooth signals. The BT radio/processor 163 may enable processing and/or handling of BT baseband signals. In this regard, the BT radio/processor 163 may process or handle BT signals received and/or BT signals transmitted via a wireless communication medium. The BT radio/processor 163 may also provide control and/or feedback information to/from the baseband processor 154 and/or the processor 156, based on information from the processed BT signals. The BT radio/processor 163 may communicate information and/or data from the processed BT signals to the processor 156 and/or to the system memory 158. Moreover, the BT radio/processor 163 may receive information from the processor 156 and/or the system memory 158, which may be processed and transmitted via the wireless communication medium a Bluetooth headset, for example The CODEC 172 may comprise suitable circuitry, logic, and/or code that may process audio signals received from and/or communicated to input/output devices. The input devices may be within or communicatively coupled to the wireless system 150, and may comprise the analog microphone 168, the stereo speakers 170, the hearing aid compatible (HAC) coil 174, the dual digital microphone 176, and the vibration transducer 178, for example. The CODEC 172 may be operable to up-convert and/or down-convert signal frequencies to desired frequencies for processing and/or transmission via an output device. The CODEC 172 may enable utilizing a plurality of digital audio inputs, such as 16 or 18-bit inputs, for example. The CODEC 172 may also enable utilizing a plurality of data sampling rate inputs. For example, the CODEC 172 may accept digital audio signals at sampling rates such as 8 kHz, 11.025 kHz, 12 kHz, 16 kHz, 22.05 kHz, 24 kHz, 32 kHz, 44.1 kHz, and/or 48 kHz. The CODEC 172 may also support mixing of a plurality of audio sources. For example, the CODEC 172 may support audio sources such as general audio, polyphonic ringer, I$^2$S FM audio, vibration driving signals, and voice. In this regard, the general audio and polyphonic ringer sources may support the plurality of sampling rates that the audio CODEC 172 is enabled to accept, while the voice source may support a portion of the plurality of sampling rates, such as 8 kHz and 16 kHz, for example.

The audio CODEC 172 may utilize a programmable infinite impulse response (IIR) filter and/or a programmable finite impulse response (FIR) filter for at least a portion of the audio sources to compensate for passband amplitude and phase fluctuation for different output devices. In this regard, filter coefficients may be configured or programmed dynamically based on current operations. Moreover, the filter coefficients may be switched in one-shot or may be switched sequentially, for example. The CODEC 172 may also utilize a modulator, such as a Delta-Sigma (Δ-Σ) modulator, for example, to code digital output signals for analog processing.

The chip 162 may comprise an integrated circuit with multiple functional blocks integrated within, such as the transceiver 152, the processor 156, the baseband processor 154, the BT radio/processor 163, the CODEC 172, the impedance matching elements 184, the phase modules 186, and the distributed antenna 164. The number of functional blocks integrated in the chip 162 is not limited to the number shown in FIG. 1. Accordingly, any number of blocks may be integrated on the chip 162 depending on chip space and wireless system 150 requirements, for example.

The distributed antenna 164 may comprise a plurality of ports for coupling signals in and/or out of the distributed antenna 164, and may be integrated in and/or on the chip 162. The physical dimensions of the distributed antenna 164 may be configured to optimize a frequency of operation and/or characteristic impedance at the plurality of ports. A plurality of power amplifiers in the transceiver 152 may be coupled to the plurality of ports via impedance match elements to enable power combining. In addition, the phase of signals communicated to the power amplifiers may be configured to enable the transmission of an RF signal via the plurality of power amplifiers and the distributed antenna 164.

The external headset port 166 may comprise a physical connection for an external headset to be communicatively coupled to the wireless system 150. The analog microphone 168 may comprise suitable circuitry, logic, and/or code that may detect sound waves and convert them to electrical signals via a piezoelectric effect, for example. The electrical signals generated by the analog microphone 168 may comprise analog signals that may require analog to digital conversion before processing.

The stereo speakers 170 may comprise a pair of speakers that may be operable to generate audio signals from electrical signals received from the CODEC 172. The HAC coil 174 may comprise suitable circuitry, logic, and/or code that may enable communication between the wireless system 150 and a T-coil in a hearing aid, for example. In this manner, electrical audio signals may be communicated to a user that utilizes a hearing aid, without the need for generating sound signals via a speaker, such as the stereo speakers 170, and converting the generated sound signals back to electrical signals in a hearing aid, and subsequently back into amplified sound signals in the user's ear, for example.

The dual digital microphone 176 may comprise suitable circuitry, logic, and/or code that may be operable to detect sound waves and convert them to electrical signals. The electrical signals generated by the dual digital microphone 176 may comprise digital signals, and thus may not require analog to digital conversion prior to digital processing in the CODEC 172. The dual digital microphone 176 may enable beamforming capabilities, for example.

The vibration transducer 178 may comprise suitable circuitry, logic, and/or code that may enable notification of an incoming call, alerts and/or message to the wireless system 150 without the use of sound. The vibration transducer may generate vibrations that may be in synch with, for example, audio signals such as speech or music.

The impedance matching elements 184 may comprise suitable circuitry, logic, and/or code that may be operable to impedance match PAs in the transceiver 152 to the distributed antenna 164. The impedance matching elements 184 may comprise capacitors, inductors, and/or resistors, for example. In another embodiment of the invention, one or more components of the impedance matching elements 184 may be located external to the chip 162.

The phase modules 186 may comprise suitable, circuitry, logic and/or code that may be operable to configure the phase of signals to be communicated to the distributed antenna 164 via the transceiver 152.

In operation, control and/or data information, which may comprise the programmable parameters, may be transferred from other portions of the wireless system 150, not shown in FIG. 1, to the processor 156. Similarly, the processor 156 may be enabled to transfer control and/or data information, which may include the programmable parameters, to other portions of the wireless system 150, not shown in FIG. 1, which may be part of the wireless system 150.

The processor 156 may utilize the received control and/or data information, which may comprise the programmable parameters, to determine an operating mode of the transceiver 152. For example, the processor 156 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 158 via the processor 156, for example. The information stored in system memory 158 may be transferred to the transceiver 152 from the system memory 158 via the processor 156.

The CODEC 172 in the wireless system 150 may communicate with the processor 156 in order to transfer audio data and control signals. Control registers for the CODEC 172 may reside within the processor 156. The processor 156 may exchange audio signals and control information via the system memory 158. The CODEC 172 may up-convert and/or down-convert the frequencies of multiple audio sources for processing at a desired sampling rate.

The wireless signals may be transmitted by the distributed antenna 164 which may comprise a plurality of input/output ports. The characteristic impedance seen by a PA coupled to a particular port may be configured by the physical dimensions and by which of the plurality of ports the device may be coupled to, for example. In an embodiment of the invention, a plurality of PAs may be coupled to a plurality of ports on the distributed antenna 164 to enable power combining such that each PA may supply a portion of the total output power radiated by the distributed antenna 164. Power combining utilizing the distributed antenna 164 may increase the performance of the wireless system 150 by increasing the efficiency of the PAs in the transceiver 152 since each PA may only drive a portion of the total power output. This may result in better signal quality and linearity, since devices may not be driven to high levels that may cause distortion, for example.

Figure 2:
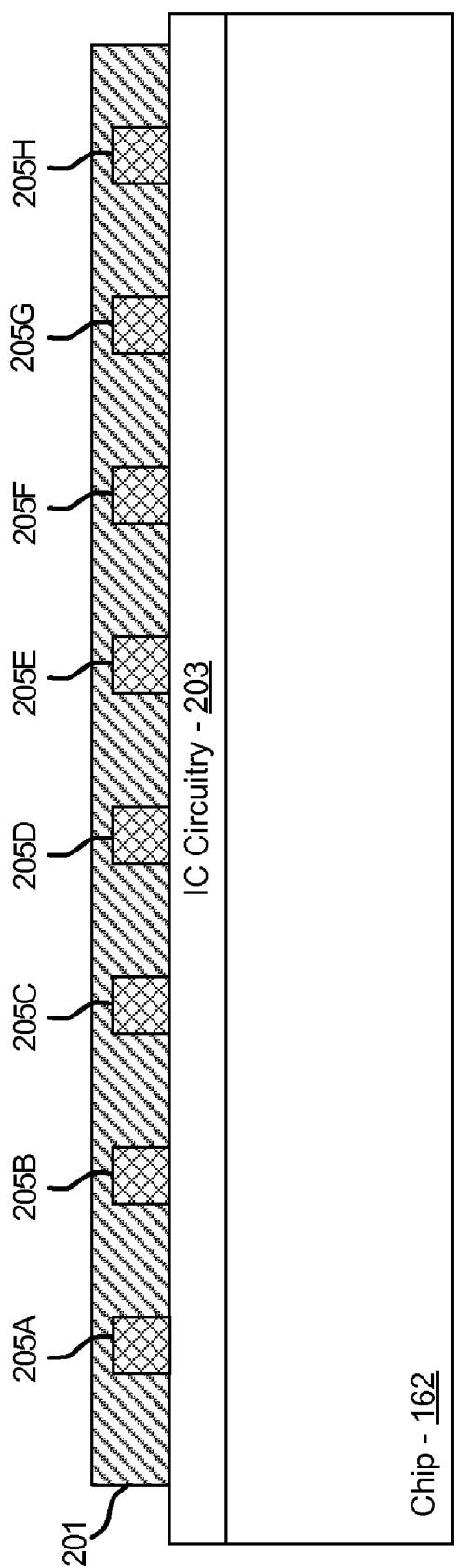
FIG. 2 is a block diagram illustrating an exemplary multi-port distributed antenna on a chip, in accordance with an embodiment of the invention.

FIG. 2 is a block diagram illustrating an exemplary multiport distributed antenna on a chip, in accordance with an embodiment of the invention. Referring to FIG. 2, there is shown the chip 162, a distributed antenna 201, IC circuitry 203, and antenna ports 205A-205H. The chip 162 may be as described with respect to FIG. 1. The IC circuitry 203 may comprise devices integrated in the chip 162, such as the transceiver 152, the processor 156, and the baseband processor 154, for example. The chip 162 comprising the multiport distributed antenna 164 may be integrated with the wireless system 150.

The distributed antenna 201, which may be substantially similar to the distributed antenna 164 described with respect to FIG. 1, may comprise an antenna integrated in and/or on the chip 162 that may comprise a plurality of ports, the antenna ports 205A-205H, such that driver and receiver circuitry may be coupled to appropriate points along the distributed antenna 201. For example, LNAs with higher input impedance may be coupled to ports that exhibit high characteristic impedance, and PAs with lower output impedance may be coupled to ports that exhibit low characteristic impedance. The distributed antenna 201 may comprise a microstrip or coplanar waveguide, for example.

The antenna ports 205A-205H may comprise electrical contacts along the length of the distributed antenna 201 that may enable coupling to the antenna at a plurality of points. In this manner, devices may be coupled to the distributed antenna 201 where the characteristic impedance may be matched to the desirable impedance for the device to be coupled. The antenna ports 205A-205H may comprise metal strips, for example, that may be electrically coupled to the distributed antenna 201.

In operation, the PAs in the transceiver 152 on the chip 162 may be coupled to the antenna ports 205A-205H to enable power combining. Phase matching and impedance matching circuitry, such as the impedance matching elements 184 and the phase modules 186 described with respect to FIG. 1, may be utilized to match each PA to the characteristic impedance of the particular antenna port 205A-205H and to provide a coherent RF signal to be transmitted from the plurality of output signal from the PAs.

Figure 3:
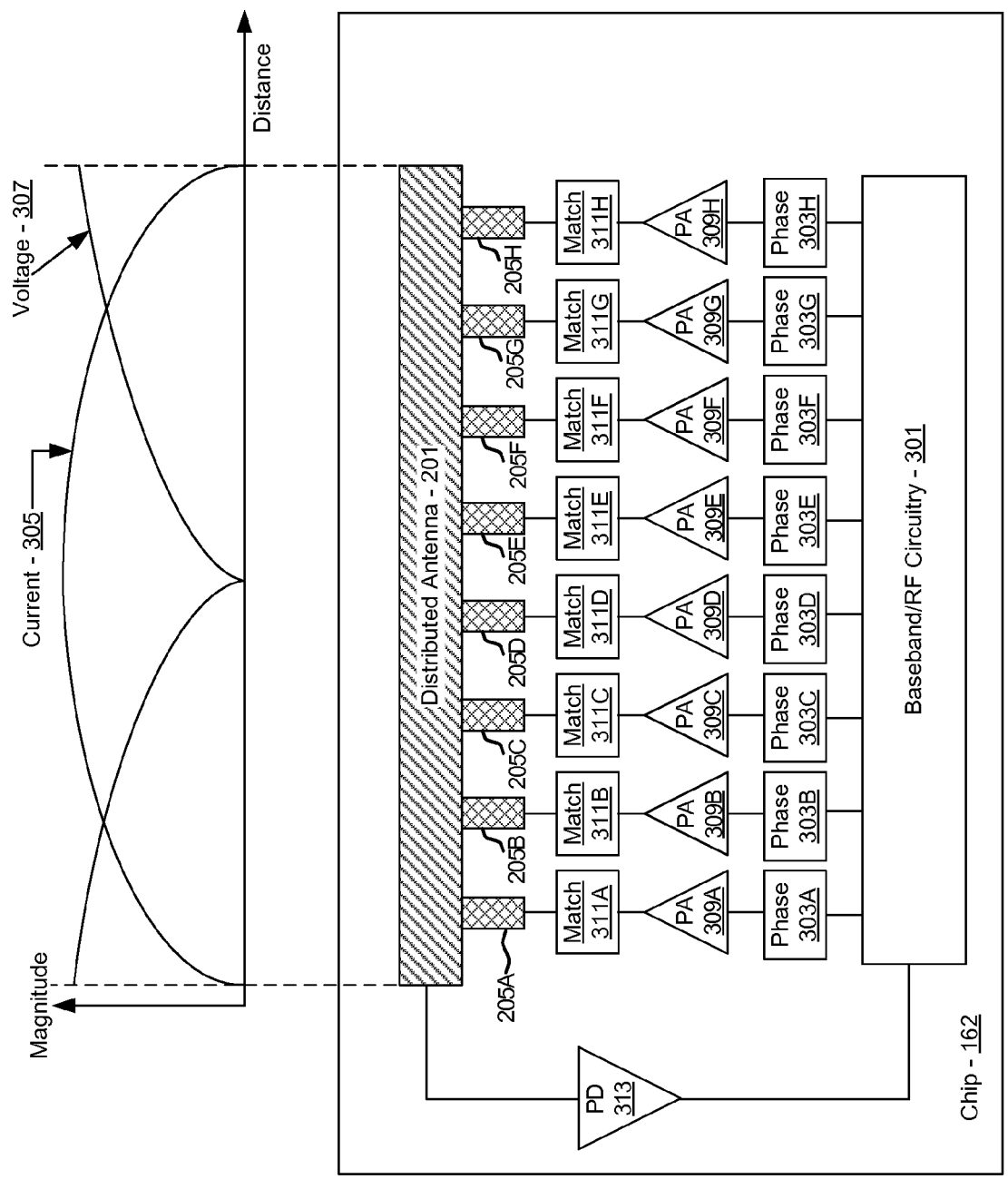
FIG. 3 is a block diagram illustrating a plan view of an exemplary multi-port distributed antenna on a chip, in accordance with an embodiment of the invention.

FIG. 3 is a block diagram illustrating a plan view of an exemplary multi-port distributed antenna on a chip, in accordance with an embodiment of the invention. Referring to FIG. 3, there is shown the chip 162, the distributed antenna 201, the antenna ports 205A-205H, baseband/RF circuitry 301, phase modules 303A-303H, power amplifiers (PAs) 309A-309H, impedance matching elements 311A-311C, and a power detector 313. There is also shown a current versus distance plot 305 and a voltage versus distance plot 307.

The baseband/RF circuitry 301 may comprise suitable, circuitry, logic and/or code that may be operable to process baseband and RF signals. Baseband signals may be down-converted received RF signals, or may be generated by input devices such as microphones, for example. The baseband/RF circuitry 301 may comprise the transceiver 152, the baseband processor 154, the processor 156, the CODEC 172, and the BT radio/processor 163, for example, described with respect to FIG. 1. Accordingly, the baseband/RF circuitry 301 may generate signals to be transmitted by the distributed antenna 201 via the phase modules 303A-303H, the PAs 309A-309H, and the impedance matching elements 311A-311H.

The phase modules 303A-303H may comprise suitable, circuitry, logic and/or code that may be operable to configure the phase of signals to be communicated to the distributed antenna 201 via the PAs 309A-309H and the impedance matching elements 311A-311H.

The PAs 309A-309H may comprise suitable circuitry, logic, and/or code that may be operable to amplify signals received from the baseband/RF circuitry 301 to be communicated to the distributed antenna 201 via the impedance matching elements 311A-311H. The PAs 309A-309H may comprise switches, such as CMOS transistors, for example, that may enable coupling and decoupling of the PAs to an antenna port.

The impedance matching elements 311A-311H may comprise suitable circuitry, logic, and/or code that may be operable to impedance match the PAs 309A-309H to the distributed antenna 201. The impedance matching blocks may comprise capacitors, inductors, and/or resistors, for example. In another embodiment of the invention, one or more components of the impedance matching elements 311A-311H may be located external to the chip 162.

The power detector 313 may comprise suitable circuitry, logic, and/or code that may be operable to detect the power level of an RF signal for transmission by the distributed antenna 201. The power detector 313 may comprise an envelope detector, such as a diode, for example, and may communicate a power level signal to the baseband/RF circuitry 301 for tuning of the output power to a desired level.

The current versus distance plot 305 may represent the magnitude of current across the length of the distributed antenna 201. Similarly, the voltage versus distance plot 307 may represent the magnitude of voltage across the length of the distributed antenna 201. The current and voltage at a given point on a distributed antenna may be dependant on the frequency of signals to be transmitted and/or received, the conductivity of the metal and the dielectric constant between the antenna and a ground plane, and by the physical dimensions of the antenna. Accordingly, the impedance matching elements 311A-311H may enable the coupling of the PA's 309A-309H to different ports on the distributed antenna 201 which exhibit different characteristic impedance.

The number of antenna ports 205A-105H is not limited to the number shown in FIGS. 2 and 3. Accordingly, any number of ports and amplifiers may be utilized depending on the desired output power of the distributed antenna 201 and the amount of power available from each PA 309A-309H, for example.

In operation, RF signals may be generated by the baseband/RF circuitry 301 for transmission by the distributed antenna 201. The baseband/RF circuitry may communicate the signal over a plurality of paths to the distributed antenna 201 via the phase modules 303A-303H, the PAs 309A-309H, and the impedance matching elements 311A-311H. The phase modules 303A-303H may enable the generation of a coherent signal at the distributed antenna 201 despite delays encountered in the individual paths defined by the PAs 309A-309H and impedance matching elements 311A-311H. Similarly, the impedance matching elements 311A-311H may match the impedance of each PA 309A-309H to the associated antenna port 205A-205H. The characteristic impedance at each port may be a function of the position along the length of the distributed antenna 201, as indicated by the exemplary current versus distance plot 305 and the voltage versus distance plot 307.

In an embodiment of the invention, the number of PAs 309A-309H in operation at a given time may vary such that in low power applications, fewer of the PAs 309A-309H may be enabled, for example, or a greater number of PAs 309A-309H may be enabled for higher power applications. In this manner, the output power of the distributed antenna 201 may be adjusted by coupling and decoupling the PAs 309A-309H from the antenna, as opposed to adjusting the power of individual PAs 309A-309H. Thus, the PAs 309A-309H may be operated at optimum performance parameters, in terms of output power versus linearity and power consumption, for example, while still allowing adjustment of transmitted signal output power. In this manner, the wireless system 150 may communicated high quality signals at high powers and with higher efficiency.

Figure 4:
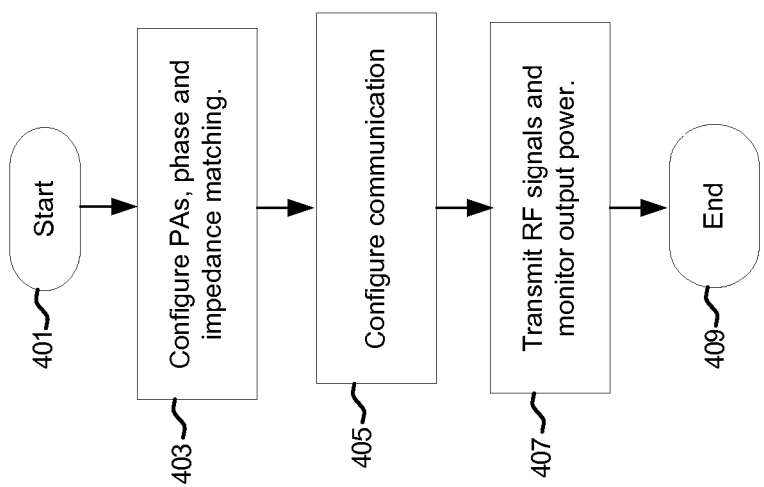
FIG. 4 is a flow chart illustrating exemplary steps for power combining in a multiport distributed antenna, in accordance with an embodiment of the invention.

FIG. 4 is a flow chart illustrating exemplary steps for power combining in a multiport distributed antenna, in accordance with an embodiment of the invention. Referring to FIG. 4, in step 403 after start step 401, the PAs 309A-309H may be enabled to transmit signals to the distributed antenna 201 via the impedance matching elements 311A-311H and the antenna ports 205A-205H according to the desired output power level. The phase modules 303A-303H may configure the phase of the individual paths to the distributed antenna 201, and the impedance matching elements 311A-311H may impedance match the PAs 309A-309H to the associated antenna port 205A-205H. In step 405, RF communication may be configured by the baseband/RF circuitry 301. In this regard, the baseband/RF circuitry 301 may process received input signals and up convert the signals to RF frequencies for transmission. In step 407, RF signals may be communicated to the distributed antenna 201 via the antenna ports 205A-205H, the PAs 309A-309H, and the phase modules 303A-303H, where transmitted signals may be generated by the baseband/RF circuitry 301. The output power of the distributed antenna 201 may be monitored by the power detector 313, and a power level signal may be communicated to the baseband/RF circuitry 301 for power level monitoring and adjusting, followed by end step 409.

In an embodiment of the invention, a method and system are disclosed for power combining signals from a plurality of power amplifiers (PAs) on a chip. The PAs may be coupled to a single distributed antenna via a plurality of antenna ports. A phase of each of the signals may be matched at the plurality of antenna ports via phase-matching circuitry. A characteristic impedance may be configured at each of the plurality of antenna ports based on a location of each of the antenna ports. The PAs may be impedance matched to the plurality of antenna ports via impedance matching elements. A power level of the power-combined signals may be monitored via a power detector coupled to the distributed antenna. The power detector may comprise an envelope detector, such as a diode. The distributed antenna may be integrated on the chip or may be located external to the chip. The signals may comprise RF signals and the distributed antenna may comprise a microstrip antenna.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for power combining in a multi-port distributed antenna.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for enabling communication, the method comprising:
power combining, within an integrated circuit, signals from a plurality of power amplifiers (PAs) on said integrated circuit, wherein said PAs are coupled to a single distributed antenna via a plurality of antenna ports; and
matching a phase of each of said signals at said plurality of antenna ports.

2. The method according to claim 1, comprising configuring a characteristic impedance at each of said plurality of antenna ports based on a location of each of said antenna ports.

3. The method according to claim 2, comprising impedance matching said PAs to said plurality of antenna ports via one or more impedance matching elements.

4. The method according to claim 1, comprising monitoring a power level of said power-combined signals via a power detector coupled to said distributed antenna.

5. The method according to claim 4, wherein said power detector comprises an envelope detector.

6. The method according to claim 5, wherein said envelope detector comprises a diode.

7. The method according to claim 1, wherein said distributed antenna is integrated on said integrated circuit.

8. The method according to claim 1, wherein said distributed antenna is located external to said integrated circuit.

9. The method according to claim 1, wherein said signals comprise radio frequency (RF) signals.

10. A system for enabling communication, the system comprising:
one or more circuits for use in a wireless device, said one or more circuits comprising a plurality of power amplifiers (PAs) on an integrated circuit, and said plurality of power amplifiers being coupled to a single distributed antenna via a plurality of antenna ports, wherein:
said one or more circuits are operable to power combine signals from said plurality of power amplifiers; and
said one or more circuits are operable to match a phase of each of said power-combined signals at said plurality of antenna ports.

11. The system according to claim 10, wherein said one or more circuits are operable to configure a characteristic impedance at each of said plurality of antenna ports based on a location of each of said antenna ports.

12. The system according to claim 11, wherein said one or more circuits comprise one or more impedance matching elements, which are operable to impedance match said PAs to said plurality of antenna ports via impedance matching elements.

13. The system according to claim 10, wherein said one or more circuits comprise a power detector coupled to said distributed antenna, and said power detector is operable to monitor a power level of said power-combined signals.

14. The system according to claim 13, wherein said one or more circuits comprise an envelope detector, and said envelope detector is operable to function as said power detector.

15. The system according to claim 14, wherein said one or more circuits comprise a diode, and said diode is operable to function as said envelope detector.

16. The system according to claim 10, wherein said distributed antenna is integrated on said integrated circuit.

17. The system according to claim 10, wherein said distributed antenna is located external to said integrated circuit.

18. The system according to claim 10, wherein said signals comprise radio frequency (RF) signals.

19. The system according to claim 10, wherein said distributed antenna comprises a microstrip antenna.

20. A system for enabling communication, the system comprising:
one or more circuits in an integrated circuit for use in a wireless device, said one or more circuits comprising a plurality of power amplifiers coupled to a single distributed antenna via a plurality of antenna ports, wherein:
said one or more circuits are operable to power combine signals from said plurality of power amplifiers;
said one or more circuits are operable to match a phase of each of said power-combined signals at said plurality of antenna ports; and
said one or more circuits are operable to adjust an output power of said single distributed antenna by adjustment of a number of said plurality of power amplifiers coupled to said single distributed antenna.

* * * * *